Sept. 11, 1962   S. B. SILVERSCHOTZ ET AL   3,054,011
ELECTRIC MOTOR

Filed Feb. 27, 1959   3 Sheets-Sheet 1

INVENTORS.
STANFORD B. SILVERSCHOTZ
STANLEY SCHREIBER
BY
ATTORNEY

Sept. 11, 1962  S. B. SILVERSCHOTZ ET AL  3,054,011
ELECTRIC MOTOR
Filed Feb. 27, 1959  3 Sheets-Sheet 2
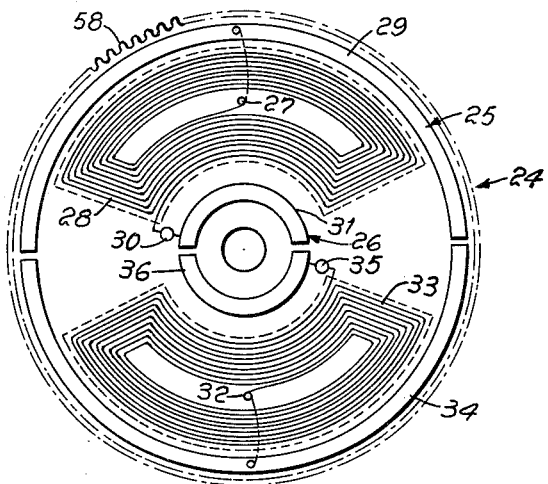
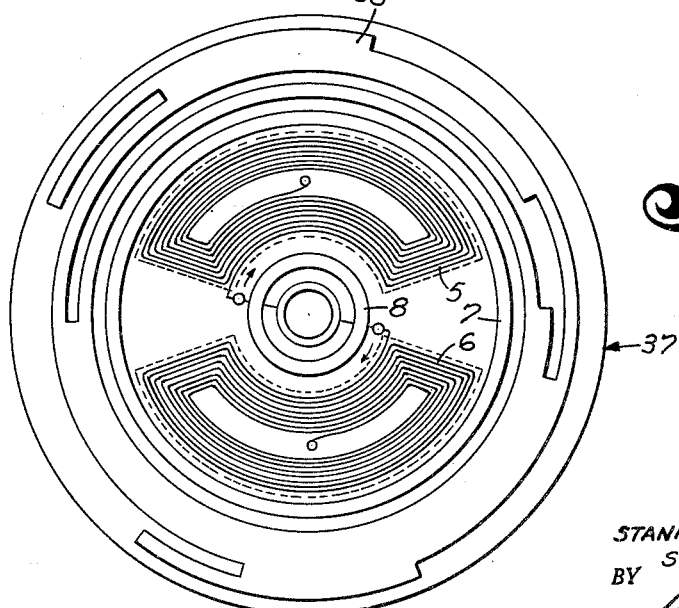
INVENTORS.
STANFORD B. SILVERSCHOTZ
STANLEY SCHREIBER
BY
ATTORNEY Sept. 11, 1962  S. B. SILVERSCHOTZ ET AL  3,054,011
ELECTRIC MOTOR Filed Feb. 27, 1959  3 Sheets-Sheet 3

INVENTORS.
STANFORD B. SILVERSCHOTZ
BY STANLEY SCHREIBER

*Percy P. Lantz*
ATTORNEY

United States Patent Office 3,054,011
Patented Sept. 11, 1962

3,054,011
ELECTRIC MOTOR
Stanford B. Silverschotz, New York, N.Y., and Stanley Schreiber, Wayne, N.J., assignors to International Telephone and Telegraph Corporation, Nutley, N.J., a corporation of Maryland
Filed Feb. 27, 1959, Ser. No. 796,166
7 Claims. (Cl. 310—268)

This invention relates to electric motors and more particularly to an electric motor having printed circuit stator and rotor.

An object of this invention is to provide compactness and low cost in an electric motor.

A feature of this invention is an electric motor comprised of substantially flat printed coils for the stator and rotor.

A further feature is the provision of a layer of magnetically permeable material underlying the printed coils to increase the magnetic flux density.

Another feature is an electric motor comprising a printed circuit stator and rotor, each having coils printed on a layer of dielectric material wherein the windings of the rotor and stator coils are opposite in sense.

Another feature is a printed circuit A.C. motor wherein printed collector rings are disposed on the surface of the dielectric aforementioned, such that a first collector ring encompasses the motor coils and the second collector ring is disposed interiorly and concentrically thereof.

Another feature is a printed D.C. motor.

Another feature is a printed motor with coding segments printed on the same dielectric base as the motor coils.

Another feature is a printed circuit code disk rotor which has the coils and collector rings for connection thereto and conductive code strips disposed on the same surface encompassing the first collector ring.

A further feature of this invention is an electric clock comprising a printed circuit alternating current motor of the construction described and a gear train driven by the rotor.

The above-mentioned and other features and objects of this invention will become more apparent by reference to the following description taken in conjunction with the accompanying drawings, in which:

FIG. 3 is a plan view of a direct current printed circuit rotor;

FIG. 4 is a plan view of a printed circuit code disk rotor;

FIG. 5 is a side view in section of an encoder using the printed circuit electric motor and code disk of this invention;

Figure 1:
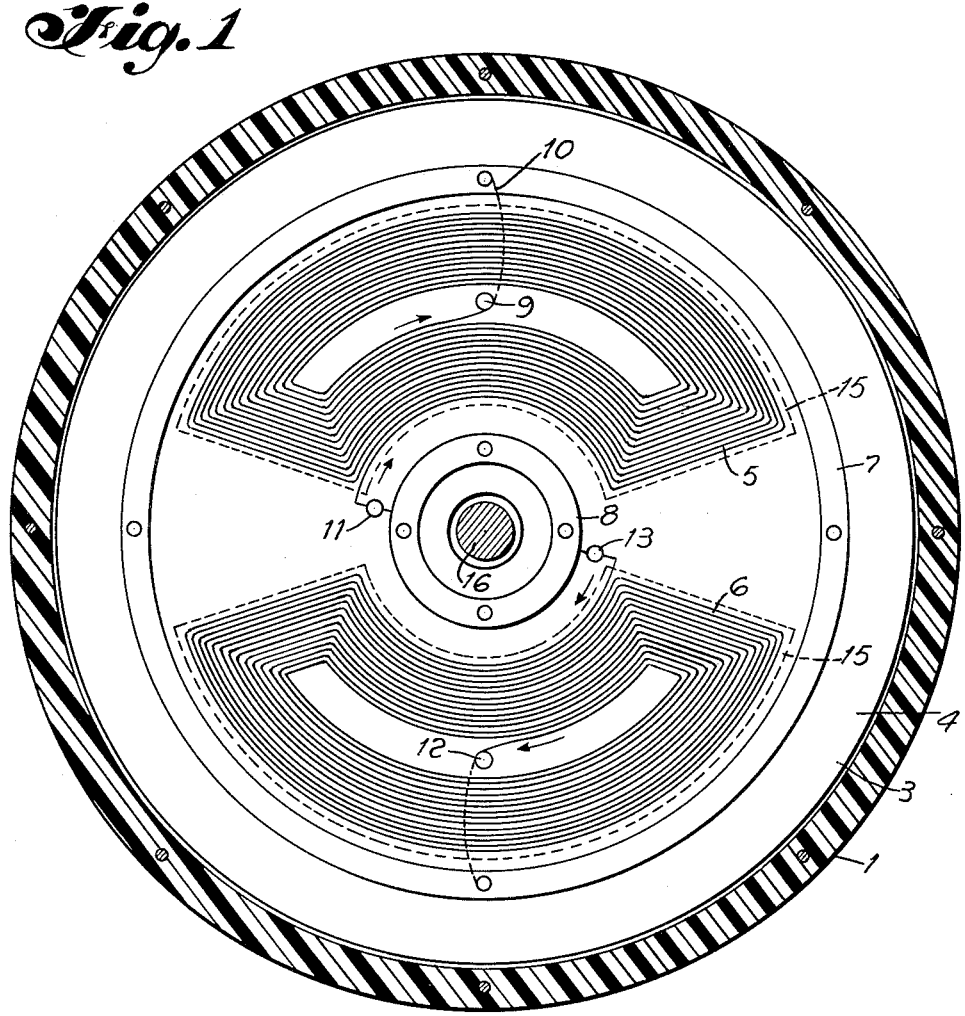
FIG. 1 is a plan view of a typical stator of this invention.
Figure 2:
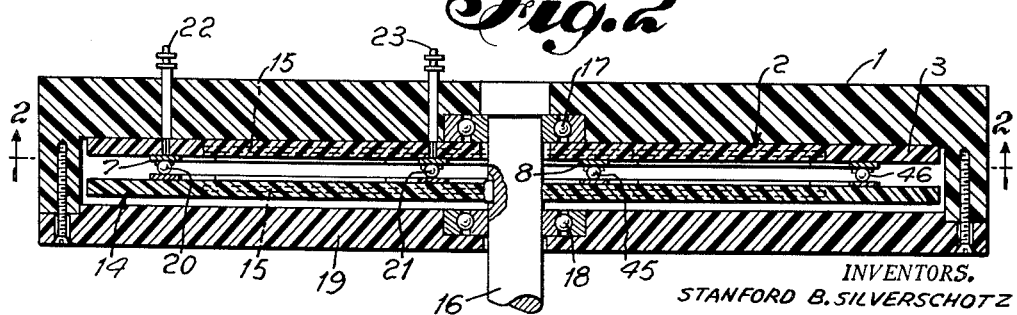
FIG. 2 is a view in section showing the assembled electric motor.

Referring now to FIGURES 1 and 2, there is shown a housing 1 containing a stator 2 which comprises a circular disk 3 formed from any suitable dielectric material. On one surface 4 of the disk 3 are printed a plurality of coils 5 and 6 which are concentrically located and disposed symmetrically on opposite sides of the disk 3. Encompassing the coils 5 and 6 is a concentric collector ring 7 and disposed interiorly of the coils is a concentric collector ring 8. The end 9 of coil 5 is connected to the collector ring 7 by means of a lead 10 and the other end 11 of the coil 5 is connected to the collector ring 8. Similarly, the end 12 of coil 6 is connected to the collector ring 7 and the other end 13 thereof is connected to the collector ring 8. The coils 5 and 6 are printed in a convoluted fashion and are connected in parallel.

The rotor 14 is printed on similar dielectric material in exactly the same manner as the stator but is disposed coil face to coil face with the stator so that the direction of winding of the coils on the rotor 14 is opposite to that of the coils on the stator 2. A layer of magnetically permeable material 15 is disposed within the dielectric material underlying each coil and spaced away from the coils and thereby insulated therefrom to provide increased magnetic flux density therefor. The rotor 14 is mounted for rotation on a shaft 16 which rotates within ball bearings 17 and 18, ball bearing 17 being in the housing 1 and ball bearing 18 being disposed in the cover plate 19. Brush 20 couples the collector ring 7 on the stator 2 to the corresponding collector ring on the rotor and brush 21 couples the inner collector ring 8 of the stator to the corresponding inner collector ring of the rotor. Conductor terminals 22 and 23 provide a means of connecting the collector rings 7 and 8 to a source of alternating current.

FIG. 3 illustrates a printed circuit rotor 24 for a direct current motor. The segmented collector rings 25 and 26 are similar to the conventional commutators for direct current motors. The end 27 of coil 28 is connected to the commutator segment 29 and the end 30 is connected to the inner commutator segment 31. The end 32 of coil 33 is connected to outer commutator segment 34 and the end 35 of the coil 33 is connected to the inner commutator segment 36. To convert the alternating current motor of FIG. 2 to a direct current motor, all that is necessary is to substitute the rotor 24 for the rotor 14 of FIG. 2 and connect a source of direct current to terminals 22 and 23. It is to be understood that the stators and rotors may have more than two coils which in the illustration shown constitute a bipolar motor, the number of poles of course being equivalent to the number of coils. The number of commutator segments of the direct current rotor would of course be equal to the number of coils disposed on the surface of the rotor.

With respect to FIGS. 4 and 5, there is shown an encoding disk 37 which comprises the collector rings 7 and 8 and the rotor coils 5 and 6 as more fully described above. Encompassing the collector ring 7, there is disposed a series of conductive strips 38 comprising the coding means of the encoding disk 37. The encoding disk 37 is the rotor of the encoding device 39. The brushes 40, 41, 42, 43 and 44 contact the code information strips 38 to provide a means of coupling input and output signals or pulses from the conductive coding means 38. The encoding device 39 is the same as the alternating current motor of FIG. 1 with the exception of the encoding disk 37 and the brushes 40, 41, 42, 43 and 44.

To maintain the rotors in the desired parallel juxtaposed relationship with the stators, spacers 45 and 46 (FIG. 2) are provided on which the collector rings 7 and 8 of the alternating current rotors roll or if the direct current rotor 24 is used in a direct current motor, the commutators 25 and 26 (FIG. 3) will roll thereon.

Figure 6:
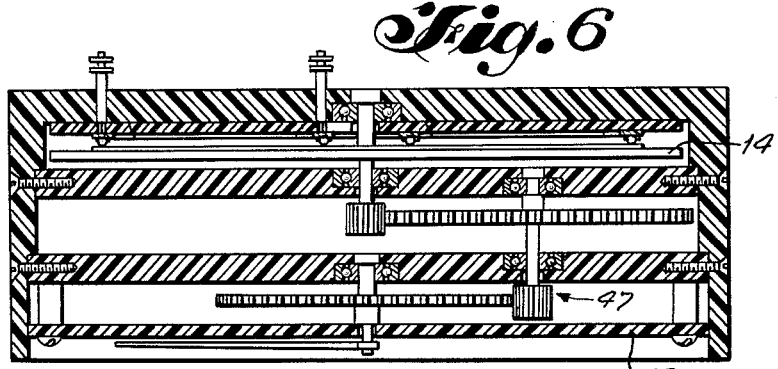
FIG. 6 is a view in section of an electric motor driven clock utilizing a printed circuit electric motor of this invention.

An electric motor driven clock utilizing the printed circuit electric motor of this invention is shown in FIG. 6. A gear train 47 is driven by the rotor 14 to drive the conventional clock mechanism (not shown) which moves the second, minute and hour hands about the clock face 48.

Figure 7:
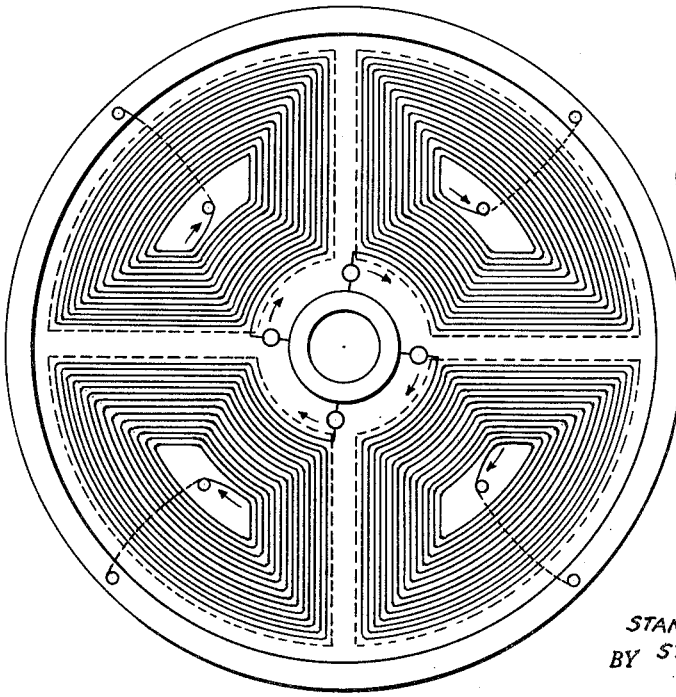
FIG. 7 is a plan view of an alternating current printed circuit stator or rotor having more than two coils thereon.

In FIG. 7 there is shown a coil arrangement suitable for use as a stator or rotor disk, each disk having four coils disposed concentrically and symmetrically on the surface of the disk to form a repulsion motor. It is to be understood of course that four coils or more can be used as may be required by the particular apparatus using the printed circuit motor of this invention. More poles lower the speed and provide smoother operation.

Figure 8:
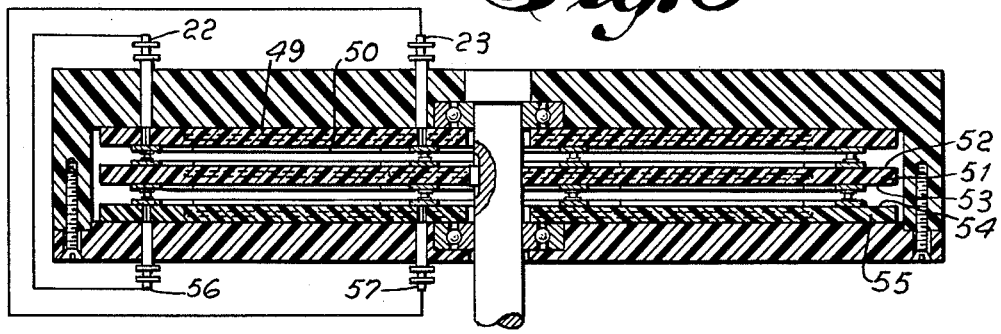
FIG. 8 is a view in section of a printed circuit electric motor having a plurality of stators and rotors.

FIG. 8 discloses an embodiment wherein a plurality of stator coil disks and rotor coil disks are used to provide increased power to the motor. The stator 49 is similar to the stator 2 with the printed circuit coils disposed on the surface 50. The rotor 51 has printed circuit coils on the surface 52 which are similar to the printed circuit coils of the rotor 14. The rotor printed circuit coils on surface 52 are wound in a direction opposite to the printed circuit coils of the stator 49 on surface 50 so that the magnetic fields set up in the rotor will be opposite to the magnetic fields of the stator 49. On surface 53 of the rotor 51, coils are printed which are wound in the same direction as the coils on surface 52 of the rotor, so that the magnetic field set up by the current flow in both rotor coils are the same. The coils on surface 54 of the stator 55 are wound in a direction opposite to the rotor coils of surface 53. Terminals 56 and 57 connect the collector rings of the surface 54 coils to the alternating current source, as are the terminals 22 and 23. In effect, the magnetic field of the coils on surface 50 opposes the magnetic field of the coils on surface 52 and the magnetic field of the coils on surface 53 opposes the magnetic field of the coils on surface 54 to cause the relative rotation of the rotor with respect to the stators 49 and 55.

It is possible to provide gear teeth 58 on the periphery of the rotor as shown in FIG. 3 so that power transfer may be effected therefrom by coupling a gear train to the peripheral teeth.

While we have described above the principles of our invention in connection with specific apparatus, it is to be clearly understood that this description is made only by way of example and not as a limitation to the scope of our invention as set forth in the objects thereof and in the accompanying claims.

We claim:

1. A printed circuit alternating current electric motor comprising a stator and a rotor, each comprising a disk of dielectric material, a plurality of coils and first and second conductive collector rings disposed on one surface of said disk, said first collector ring encompassing said coils and said second collector ring being disposed interiorly of said coils, means connecting the corresponding end of each coil to said first collector ring, means connecting the corresponding other end of each said coil to said second collector ring, the coils of said stator being wound in a direction opposite to the coils of said rotor, a housing, means statically mounting said stator to the base of said housing, means rotatably mounting said rotor in parallel juxtaposed relation to said stator on an axis common to said stator and said rotor, means coupling said first collector rings of said stator and rotor disks to each other, means coupling said second collector rings of said stator and rotor disks to each other, means coupling a source of alternating current to said stator and rotor coils whereby the magnetic field set up by the current flow in said rotor coils is opposed to the magnetic field of said stator and causes relative rotation of said rotor with respect to said stator.

2. A printed circuit alternating current electric motor comprising a stator and a rotor, each comprising a disk of dielectric material, a plurality of coils and first and second conductive collector rings disposed on one surface of said disk, said first collector ring encompassing said coils and said second collector ring being disposed interiorly of said coils, a layer of magnetically permeable material disposed within said disk substantially parallel to said surface and underlying said coils, means connecting the corresponding end of each coil to said first collector ring, means connecting the corresponding other end of each said coil to said second collector ring, the coils of said stator being wound in a direction opposite to the coils of said rotor, a housing, means statically mounting said stator to the base of said housing, means rotatably mounting said rotor in parallel juxtaposed relation to said stator on an axis common to said stator and said rotor, means coupling said first collector rings of said stator and rotor disks to each other, means coupling said second collector rings of said stator and rotor disks to each other, means coupling a source of alternating current to said stator and rotor coils whereby the magnetic field set up by the current flow in said rotor coils is opposed to the magnetic field of said stator and causes relative rotation of said rotor with respect to said stator.

3. A printed circuit alternating current electric motor comprising a stator and a rotor, each comprising a disk of dielectric material, a plurality of coils and first and second conductive collector rings disposed on one surface of said disk, said first collector ring encompassing said coils and said second collector ring being disposed interiorly of said coils, a layer of magnetically permeable material disposed within said disk substantially parallel to said surface and underlying said coils, means connecting the corresponding end of each coil to said first collector ring, means connecting the corresponding other end of each said coil to said second collector ring, the coils of said stator being wound in a direction opposite to the coils of said rotor, a housing, means statically mounting said stator to the base of said housing, means rotatably mounting said rotor in parallel juxtaposed relation to said stator on an axis common to said stator and said rotor, means coupling a source of alternating current to said first and second collector rings of said stator, a plurality of brushes respectively connecting said first and second collector rings of said stator to said first and second collector rings of said rotor to couple said electrical energy to said rotor, whereby the magnetic field set up by the current flow in said rotor coils is opposed to the magnetic field of said stator and causes relative rotation of said rotor with respect to said stator.

4. A printed circuit alternating current electric motor comprising a stator and a rotor, each comprising a disk of dielectric material, a plurality of coils and first and second conductive collector rings disposed on one surface of said disk, said first collector ring encompassing said coils and said second collector ring being disposed interiorly of said coils, a layer of magnetically permeable material disposed within said disk substantially parallel to said surface and underlying said coils, means connecting the corresponding end of each coil to said first collector ring, means connecting the corresponding other end of each said coil to said second collector ring, the coils of said stator being wound in a direction opposite to the coils of said rotor, a housing, means statically mounting said stator to the base of said housing, means rotatably mounting said rotor in parallel juxtaposed relation to said stator on an axis common to said stator and said rotor, spacer means disposed between said stator and said rotor to maintain said stator and said rotor in said parallel relation, means coupling a source of alternating current to said first and second collector rings of said stator, a plurality of brushes respectively connecting said first and second collector rings of said stator to said first and second collector rings of said rotor to couple said electrical energy to said rotor whereby the magnetic field set up by the current flow in said rotor coils is opposed to the magnetic field of said stator and causes relative rotation of said rotor with respect to said stator.

5. A printed circuit direct current electric motor comprising a stator and a rotor, each comprising a disk of dielectric material, a plurality of coils disposed on one surface of said disk, a layer of magnetically permeable material disposed within said disk substantially parallel to said surface and underlying each said coil, said stator further including first and second annuli disposed on said surface, said first annulus encompassing said stator coils, said second annulus being disposed interiorly of said coils, means connecting the corresponding end of each stator coil to said first annulus, means connecting the corresponding other end of each stator coil to said second annulus, said rotor further having first and second commutators disposed on said surface, the number of segments of each said commutator being equal to said plurality of rotor coils, said first commutator encompassing said rotor coils and said second commutator being disposed interiorly of said rotor coils, means connecting one end of each said rotor coil to a segment of said first commutator, means connecting the other end of said rotor coil to a corresponding angular segment of said second commutator, the coils of said stator being wound in a direction opposite to the coils of said rotor, a housing, means statically mounting said stator to the base of said housing, means rotatably mounting said rotor in parallel juxtaposed relation to said stator on an axis common to said stator and said rotor, spacer means disposed between said stator and said rotor to maintain said stator and said rotor in said parallel relation, means coupling a source of direct current to said first and second annuli of said stator, brush means respectively connecting said first annulus to said first commutator and said second annulus to said second commutator to couple said direct current to said rotor whereby the magnetic field set up by the current flow in said rotor coils is opposed to the magnetic field of said stator and causes relative rotation of said rotor with respect to said stator.

6. A printed circuit code disc comprising a layer of dielectric material, a plurality of coils disposed on one surface of said layer, a layer of magnetically permeable material disposed within said disk substantially parallel to said surface and underlying said coils, first and second collector rings disposed on said surface, said first ring encompassing said coils and said second ring being disposed interiorly of said coils, conductive code strips disposed on said surface encompassing said first collector ring, means connecting the corresponding end of each said coil to said first collector ring and means connecting the corresponding other end of each said coil to said second collector ring.

7. An electric motor driven clock comprising a printed circuit alternating current motor which includes a stator and a rotor, each comprising a disk of dielectric material, a plurality of coils and first and second conductive collector rings disposed on one surface of said disk, said first collector ring encompassing said coils and said second collector ring being disposed interiorly of said coils, a layer of magnetically permeable material disposed within said disk substantially parallel to said surface and underlying said coils, means connecting the corresponding end of each said coil to said first collector ring, means connecting the corresponding other end of each said coil to said second collector ring, the coils of said stator being wound in a direction opposite to the coils of said rotor, a housing, means statically mounting said stator to the base of said housing, means rotatably mounting said rotor in parallel juxtaposed relation to said stator on an axis common to said stator and said rotor, spacer means disposed between said stator and said rotor to maintain said stator and said rotor in said parallel relation, means coupling a source of alternating current to said first and second collector rings of said stator, a plurality of brushes respectively connecting said first and second collector rings of said stator to said first and second collector rings of said rotor to couple said electrical energy to said rotor, whereby the magnetic field set up by the current flow in said rotor coils is opposed to the magnetic field of said stator and causes relative rotation of said rotor with respect to said stator, and a gear train driven by said rotor.

References Cited in the file of this patent

UNITED STATES PATENTS

| 2,441,960 | Eisler | May 25, 1948 |
| 2,773,239 | Parker | Dec. 4, 1956 |

FOREIGN PATENTS

| 1,160,490 | France | Mar. 3, 1958 |